United States Patent [19]

Suzumori et al.

[11] Patent Number: 5,142,989
[45] Date of Patent: Sep. 1, 1992

[54] PROPELLING MECHANISM AND TRAVELING DEVICE PROPELLED THEREBY

[75] Inventors: Koichi Suzumori; Kokichi Aomori, both of Yokohama, Japan

[73] Assignee: Kabushiki Kaisha Toshiba, Kawasaki, Japan

[21] Appl. No.: 766,081

[22] Filed: Sep. 27, 1991

[30] Foreign Application Priority Data

Sep. 28, 1990 [JP] Japan .................. 2-259649

[51] Int. Cl.$^5$ ............................................ B61B 13/10
[52] U.S. Cl. .................... 104/138.2; 378/60; 358/100; 346/33 P; 475/332; 475/334
[58] Field of Search ............ 104/138.2; 378/60; 358/100; 346/33 P; 475/332, 334

[56] References Cited

U.S. PATENT DOCUMENTS

| | | | |
|---|---|---|---|
| 3,087,058 | 4/1963 | Arvanetakis et al. | 378/60 R |
| 3,691,385 | 9/1972 | Ketchbaw et al. | 378/60 R |
| 4,372,658 | 2/1983 | O'Connor et al. | 346/33 P X |
| 4,526,106 | 7/1985 | Okada et al. | 378/60 X |
| 4,537,136 | 8/1985 | Douglas | 378/60 X |
| 4,677,472 | 6/1987 | Wood | 358/100 R |
| 4,722,001 | 1/1988 | Röhrich et al. | 104/138.2 X |
| 5,018,451 | 5/1991 | Hapstack | 104/138.2 R |

Primary Examiner—Rodney H. Bonck
Assistant Examiner—Daniel Wittels
Attorney, Agent, or Firm—Foley & Lardner

[57] ABSTRACT

A propelling mechanism for traveling through piping comprises: a motive power device; a plurality of sun gears driven in rotation by the motive power device; at least two planet gears meshed with each one of the sun gears and rotatably supported at specifically spaced-apart positions to undergo axial rotation about their own axes and simultaneously to undergo orbital revolution around the periphery of that sun gear; and a plurality of traction wheels with treads rotating together with respective planet gears, the treads being pressed into contact with the inner wall surface by the orbital revolution of the planet gears, driving power due to the axial rotation of the planet gears being transmitted by way of the treads of the wheels as traction to the inner wall surface. A traveling device for operating as a probe to travel through piping with bends and branches is constituted by coupling two of the above described propelling mechanisms to front and rear ends of a flexible mechanism constituting the main body of the device, which is provided with a control device for deflecting the flexible mechanism in steering operation in various directions to navigate smoothly through the piping.

6 Claims, 8 Drawing Sheets

PROPELLING MECHANISM AND TRAVELING DEVICE PROPELLED THEREBY

BACKGROUND OF THE INVENTION

This invention relates to a propelling mechanism and to a traveling device propelled thereby to travel through tortuous tubular passageways such as piping. More particularly the invention relates to a propelling mechanism which has traction wheels for driving, and which is capable of thus traveling in a freely steerable manner through a passageway having bends and constrictions as the pressure of the wheels on the inner surface of the passageway is automatically adjusted.

In recent years, moving inspection probes of miniature size for traveling through and inspecting the interiors of piping in installations such as nuclear power plants and chemical plants have been developed and reduced to practical use. In piping of the above mentioned kind, complicated piping layouts are often used with numerous Tee joints, elbows, and the like.

Furthermore, many constrictions in the pipe cross section due to deposits of accumulated matter and variations of the pipe diameter at fixtures such as reducers are encountered. For this reason, there has been a great need for a traveling device such as an inspection probe which can flex freely while traveling and at the same time can cope with variations of the inner diameter of the piping.

Furthermore an additional requirement is that the one or more propelling mechanisms provided in one traveling device have ample towing power for towing control and power supply cables and the like connected to the traveling device. Still another requirement is that the traveling device have a wheel-pressing mechanism for pressing traction wheels against the inner wall surface of the piping so that the traveling device can clamber safely up a vertical pipe.

With the aim of meeting these requirements, traveling devices in which resilient force-absorbing means such as springs are interposed between traction wheels and driving mechanisms have and are being proposed. In these traveling devices, the springs deflect and absorb variations in pipe diameter. Furthermore, a traveling device in which traction wheels are pressed against the inner wall surface of the pipe to increase the friction between the wheels and the pipe inner surface and thereby to obtain a large towing (traction) force, and which thereby can clamber up vertical pipes has also been proposed.

In the above described known traveling devices, however; it is necessary to provide each wheel with a driving device. For this reason, miniaturization of the entire device is difficult. Furthermore, the above mentioned pressing force on the wheels is determined by the degree of compression of the springs. Therefore, as the weight of the device increases, the inertial load of the springs increases, and the periodic damping decreases. For this reason, it is difficult to sustain constantly the pressing force of the wheels acting on the inner wall surface of the piping. Consequently stable traveling cannot be carried out.

Furthermore, since the above mentioned pressing force is determined by the degree of compression of the springs, the pressing force becomes large at places where the pipe inner diameter is small and, conversely, becomes small at places where the inner diameter is large. In actual practice, however, there is a necessity for means for adjusting the pressing force in accordance with the load. Such means must impart a large pressing force in cases such as that where the traveling device climbs a vertical pipe and that where another piece of equipment is towed through the piping.

Still another problem existing in the prior art is the complexity of construction of steering mechanisms for enabling the traveling devices to travel smoothly through bends and branch parts of the piping.

SUMMARY OF THE INVENTION

Accordingly it is a general object of the present invention to solve the various above described problems encountered in the prior art. More specifically, it is an object of the invention to provide a traveling device possessing the advantageous features of: simple construction; capability of controllably adjusting the pressing force of the traction wheels according to the load; capability of traveling through difficult passageways such as vertical pipes; and having a flexible body structure capable of freely flexing thereby to readily travel through bends and branch parts of piping.

According to this invention in one aspect thereof, there is provided a propelling mechanism for traveling through a tubular passageway, which mechanism comprises: motive power means; a plurality of sun gears driven in rotation by the motive power means; at least two planet gears meshed with each one of the sun gears and rotatably supported at specifically spaced-apart positions to undergo axial rotation about their own rotational axes and simultaneously to undergo orbital revolution around the periphery of that sun gear; and a plurality of traction wheels with treads rotating together with respective planet gears, the treads being pressed into contact with the inner wall surface of the tubular passageway by the orbital revolution of the planet gears, driving power due to said axial rotation of the planet gears being transmitted by way of the treads of the wheels as traction to the inner wall surface of the tubular passageway.

According to the invention in another aspect thereof, there is provided a traveling device comprising a flexible mechanism constituting a main body of the device and having front and rear ends, a plurality of propelling mechanisms of the character described above which are coupled to at least the front and rear ends of the flexible mechanism, and means for controllably deflecting the flexible mechanism in various steering directions during traveling operation of the traveling device.

The propelling mechanism of the above described mechanical organization according to this invention has the following features of merit and effect. The plurality of planet gears meshed with each one of the sun gears are fixed to respective shafts, which are rotatably supported respectively by the outer ends of the two arms of a bellcrank-like Vee-shaped lever. A plurality of the traction wheels are also fixed to each of these shafts. The orbital revolution of the planet gears causes the wheels to contact and press against the inner wall surface of the tubular passageway and is thereby arrested, whereupon the wheel driving power due to the axial rotation of the planet gears is transmitted by way of the wheels and their treads to the inner wall surface of the passageway. Therefore, the greater the load acting in the direction of travel of the propelling mechanism or the reverse direction, the greater is the force with which the wheels are pressed against the inner wall surface. As a result, the reaction force from the wall surface increases, and a large propelling or traction force can be obtained.

Furthermore, the traveling device of the present invention has a freely deflectable flexible mechanism coupled at at least its front and rear ends to propelling mechanisms each as described above. The device further has means for controllably deflecting or flexing the flexible mechanism in various steering directions. Therefore the traveling device can readily pass through bends, branched parts, and riser parts of the passageway.

The nature, utility, and further features of the present invention will be more clearly apparent from the following detailed description with respect to preferred embodiments of the invention when read in conjunction with the accompanying drawings.

DESCRIPTION OF THE PREFERRED EMBODIMENTS

Figure 1:
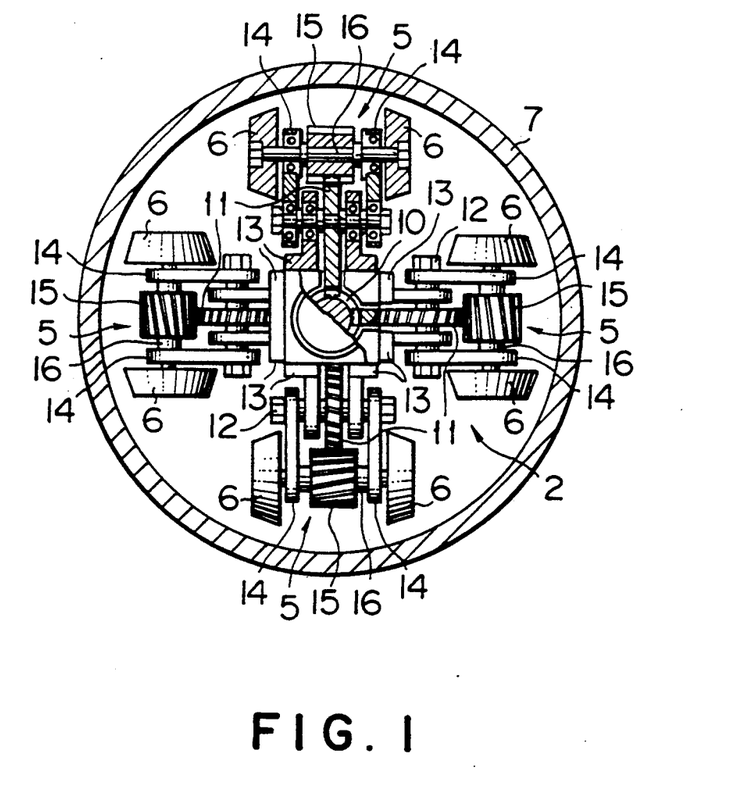
FIG. 1 is an end view, with parts shown in cross section, showing one example of the propelling mechanism according to this invention.
Figure 2:
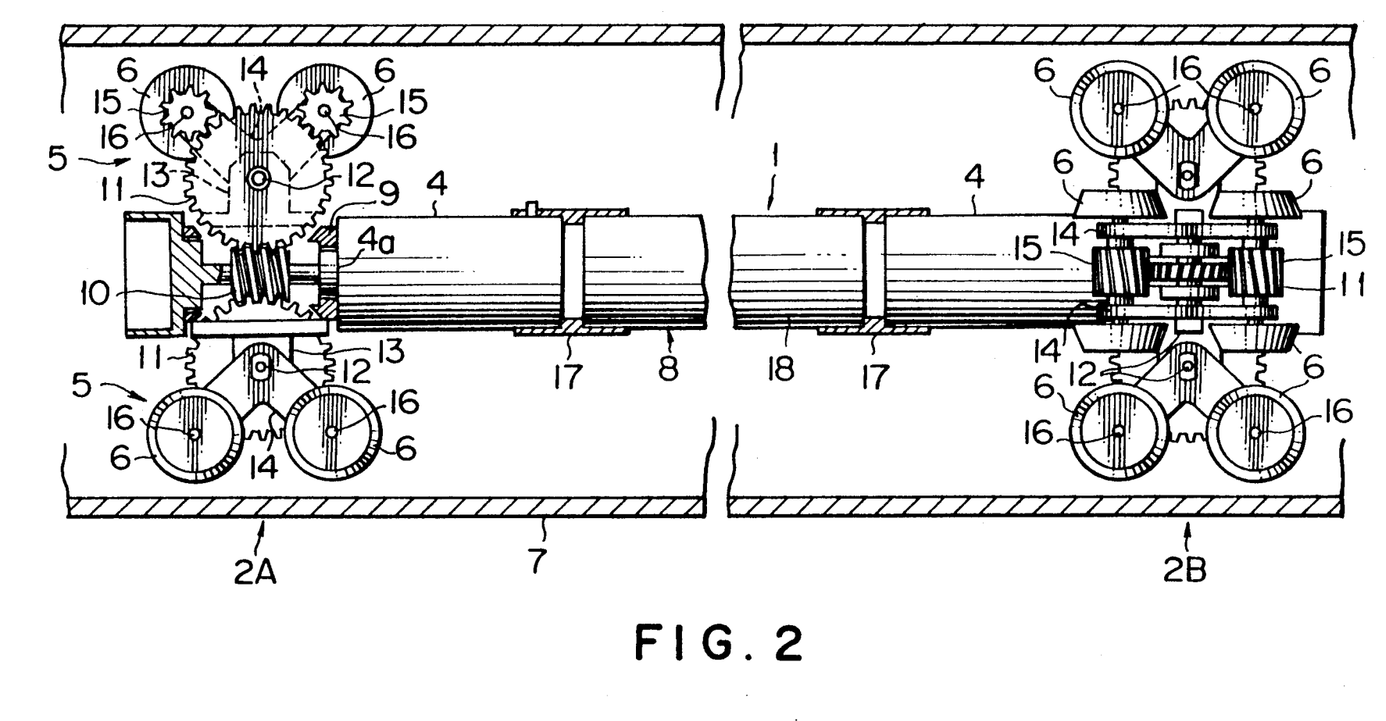
FIG. 2 is a side view, with parts shown in longitudinal section, showing an example of the traveling device according to the invention which is propelled by two propelling mechanisms each as shown in FIG. 1.

One example of a traveling device 1 according to this invention is shown in an end view in FIG. 1 and in a side view in FIG. 2. This traveling device 1 has, as essential components, at least two driving or propelling mechanisms 2 (e.g., 2A and 2B) coupled in tandem by a flexible mechanism 8.

Each propelling mechanism 2 comprises an electric motor 4 and a group of four wheel-driving mechanisms 5 connected to and supporting one end 4a of the motor 4 and having moving parts coupled to the rotor shaft of the motor 4 to be driven thereby. The other end of the motor 4 is coupled to the above mentioned flexible mechanism 8.

The entire traveling device 1 is designed to operate in an elongated tubular passageway such as the interior of a pipe 7, for example. Throughout the present disclosure, the lengthwise direction of such a passageway is referred to as the "longitudinal" direction thereof as well as of the traveling device 1. The direction of the axis or axial centerline of the pipe 7 and the direction of the rotational axis of the motor 4 are parallel.

A bearing block 9 of the shape of a square tube is fixed to the above mentioned one end 4a of the motor 4 supported by the wheel-driving mechanisms 5. This block 9 is so formed as to accommodate therewithin a worm 10 coupled to the rotor shaft of the motor 4 and alined coaxially with the axis of the rotor shaft. The four wheel-driving mechanisms 5, which are all identical, are disposed symmetrically in a cross-shaped cluster around the axis of the worm 10. These four wheel-driving mechanisms 5 have respective worm gears or wheels 11 which lie in respective planes passing through the axis of the worm 10 in a cross-shaped formation, and which are meshed with the worm 10.

Each worm wheel 11 is fixed at its center to a shaft 12, which is rotatably supported by bearings 13 fixed to a surface of the above mentioned bearing block 9. The opposite ends of each shaft 12 extend outward beyond the bearings 13 and pivotally support respective Vee-shaped or bell-crank levers 14 at their middle bend parts. Thus, two Vee-shaped levers 14 are disposed on opposite sides of and parallel to each worm wheel 11. Each Vee-shaped lever 14 has two arms of equal length. These two arms of the lever 14 on one side of the worm wheel 11 and two arms of the lever 14 on the opposite side of the same worm wheel 11 rotatably support at their outer ends two parallel axle shafts 16 which are parallel to the shaft 12.

At its middle part, each axle shaft 16 is fixed to and supports a pinion 15 interposed between two levers 14 by which that axle shaft 16 is rotatably supported. This pinion 15 is meshed with and driven by the worm wheel 11 of the same wheel-driving mechanism 5. A wheel 6 is fixed to each of the opposite ends of each axle shaft 16. Each wheel 6 has a peripheral tread made of an elastic and durable material such as silicone rubber. Thus, each propelling mechanism 2 is provided with 16 wheels 6, which are driven by driving power produced by the motor 4 and transmitted via the worm 10, the four worm wheels 11, the eight pinions 15, and the eight axle shafts 16. The wheels 6 function as driving or traction wheels for driving the propelling mechanism 2 in traveling motion.

In the example of the traveling device 1 shown in FIG. 2, two identical propelling mechanisms 2A and 2B of opposite operational directions are coupled in tandem to the opposite ends of a flexible mechanism 8. This flexible mechanism 8, which has steering capability, is thus coupled to the propelling mechanisms 2A and 2B by cylindrical couplers 17, through which the mechanisms 2A and 2B are unitarily joined.

In the instant example, the flexible mechanism 8 comprises a fluid actuator in the form of a tubular elastic structure 18 which can be caused to bend or flex into a curve in any direction by adjusting its inner pressure. The construction of this tubular elastic structure will be described hereinafter.

Figure 3:
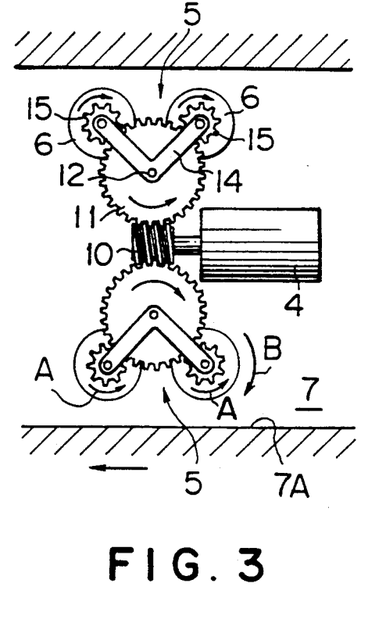
FIGS. 3 and 4 are schematic side views indicating the mechanical action in the propelling mechanism by which its traction wheels are pressed against the inner wall surface of a tubular passageway.
Figure 4:
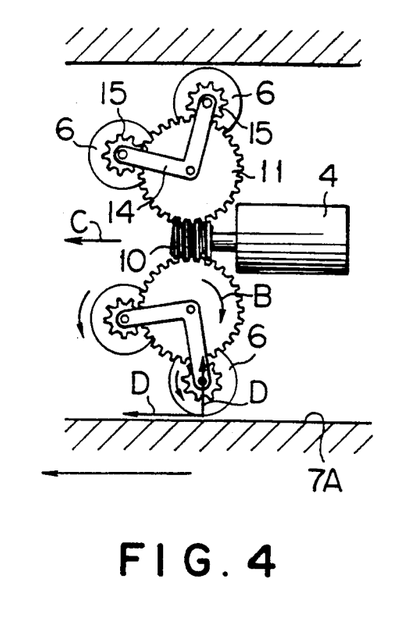

The traveling operation of the above described wheel-driving mechanisms 5 will now be described with reference to FIGS. 3 and 4. FIGS. 3 and 4 are schematic side views showing two diametrically opposite wheel-driving mechanisms 5 of the four mechanisms 5 in one propelling mechanism 2.

Because of the aforedescribed construction of the propelling mechanism 2 comprising the four wheel-driving mechanisms 5, each worm wheel 11 and the two pinions 15 meshed therewith have a mutual relationship of a sun gear and planet gears. When the worm 10 is driven in rotation by the motor 4, it rotates each of the four worm wheels 11. Accordingly, each pinion 15 meshed with its respective worm wheel 11 rotates around its own rotational axis in the arrow direction A. In concert with this rotation of each pinion 15, it also revolves in the arrow direction B along the outer periphery of its worm wheel 11.

As described hereinbefore, each pinion 15 is coaxially fixed to two wheels 6. As a consequence, a slight revolution of the pinion 15 in the B direction causes the outer side of one wheel 6 to contact and press against the inner wall surface 7A of the pipe 7 as shown in FIG. 4. Accordingly the revolution of the pinion 15 is arrested. As a result, only a torque due to the rotation of that pinion 15 about its own axis is transmitted to its wheels 6, whereby the propelling mechanism 2 is caused to travel in the arrow direction C.

The action of the resulting reactive forces imparted from the inner wall surface 7A of the pipe 7 to the wheels 6 at this time will now be considered. As described above, the wheels 6 are pressed in contact against the inner wall surface 7A. Then, in this relative state, as the load in the direction opposite to the direction of advance of the propelling mechanism 2 increases, forces in the arrow directions D as indicated in FIG. 4 act on the wheels 6. As a consequence, the bellcrank levers 14 corresponding to these wheels 6 are urged to rotate in the arrow direction B. For this reason, the pressing force of the wheels 6 against the inner wall surface 7A increases further. Therefore, ample resistance force in the form of a reactive force can be sustained. Thus the propelling mechanism 2 can perform functions such as clambering up vertical pipes without slippage of its wheels 6.

Conversely, when the load imparted to the propelling unit 2 is small, the contact of the wheels 6 is weak, and the pressing force is also small. For this reason, the resistance force from the inner wall surface 7A is also small. Accordingly, there is little likelihood of the wheels 6 being pressed excessively against the pipe inner wall surface 7A. Therefore the propelling mechanism 2 can drive the traveling device 1 as its wheels 6 turn with high energy efficiency.

In this connection, the wheels 6 revolve about their respective shafts 12 until they come into contact with the pipe inner wall surface 7A. For this reason, the propelling mechanism 2 can readily adapt to variations in the pipe diameter. Thus, the pressing force of the wheels 6 is adjusted to correspond to each pipe diameter.

Next, the aforementioned tubular elastic structure 18 used in the flexible mechanism 8 will now be described with reference to FIGS. 5(a) and 5(b).

Figure 5A:
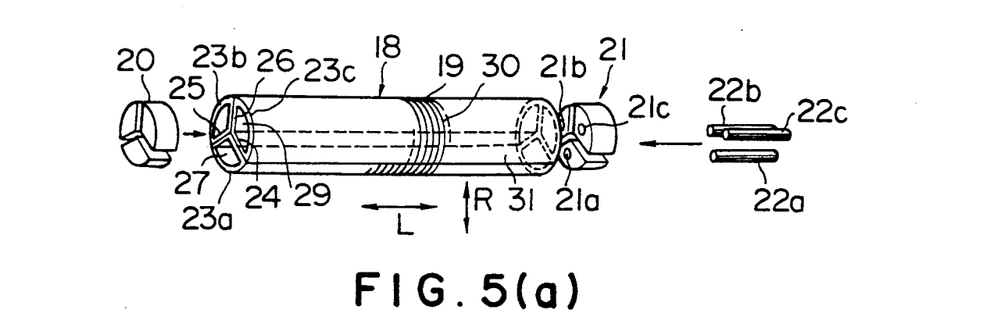
FIG. 5(a) is an exploded perspective view of a tubular elastic structure used in a flexible mechanism according to the invention.

As shown in FIG. 5A, the tubular elastic structure 18 comprises: an elastic trunk 19 forming an outer tubular wall; a leading-end plug 20 and a base-end plug 21 fixed to the ends of the elastic trunk 19; and three operating tubes 22a, 22b, and 22c. The elastic trunk 19 is an integrally formed tubular structure comprising three unit elastic tubes 23a, 23b, and 23c of identical shape having sector-shaped cross sections and bonded parallelly together in their axial direction. By this construction, three elastic partition walls 24, 25, and 26 extending in the longitudinal direction of the tubular elastic structure 18 in the interior thereof are formed by the bonded parts. Thus, these three partition walls form three pressure chambers 27, 28, and 29 within the interior of the tubular elastic structure 18.

Furthermore, reinforcing fiber 30 is closely wound in a helical path around the outer surface of the unit elastic tubes 23a, 23b, and 23c. A silicone rubber film 31, which is an elastic material, is formed as a covering around the outer surface of this fiber layer 30. As a result of this construction, the tubular elastic structure 18 exhibits an anisotropic elasticity characteristic due to the combined effect of the reinforcing fiber 30 and the silicone rubber film 31. The direction of low Young's modulus coincides substantially with the axial direction L of the tubular elastic structure 18. Accordingly this structure 18 readily elongates in its axial direction but not in the radial direction R perpendicularly transverse to the axial direction L because of increase in Young's modulus in the direction R due restraint of deformation by the reinforcing fiber 30.

Furthermore, the aforementioned leading-end plug 20 is made of a material such as a metal and is formed with sector-shaped parts for fitting respectively into and thereby sealing the open leading ends of the pressure chambers 27, 28, and 29. Mounting holes 21a, 21b, and 21c are formed through the base-end plug 21 parallelly in the longitudinal direction at positions corresponding to the pressure chambers 27, 28, and 29. The leading ends of the operating tubes 22a, 22b, and 22c are fitted in these mounting holes 21a, 21b, and 21c and fixed in a sealing state to the base-end plug 21 by means such as an adhesive. Thus the interiors of these operating tubes communicate with their respective pressure chambers but are sealed from the outside atmosphere.

The other ends of these operating tubes 22a, 22b, and 22c are connected to control means and a pressure source (both not shown). The control means is operated to controllably adjust the pressure of an actuating fluid supplied through each operating tube 22 to its respective pressure chamber.

The tubular elastic structure 18 of the above described construction is operated in the manner described below in the reference to FIG. 5(b).

First, the case wherein the pressure of the actuating fluid is supplied from the above mentioned pressure source via the control means and through the operating tube 22a to the pressure chamber 27 will be considered. As a consequence, the pressure within the pressure chamber 27 increases, and the walls of this chamber 27 elongate in the axial direction. Accordingly, the tubular elastic structure 18 bends upward in the direction A as indicated in FIG. 5(b) to assume the state indicated by intermittent line.

Figure 5B:
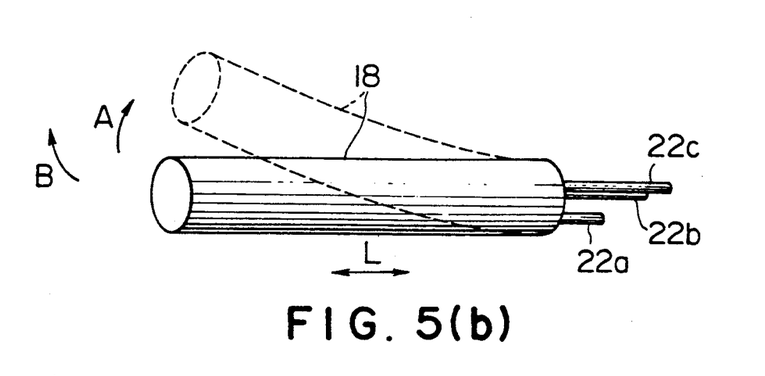
FIG. 5(b) is a schematic perspective view indicating the deflecting action of the tubular elastic structure.

When, with the elastic structure 18 in this state, the pressure within the pressure chamber 29 is increased by directing pressure through the operating tube 22c, the elastic structure 18 bends in the direction B or away from the viewer of FIG. 5(b). By varying the combination of pressures applied the three pressure chambers 27, 28, and 29 in this manner, the elastic structure 18 can be bent in any desired direction. Furthermore, by increasing equally the pressures in the three pressure chambers, the tubular elastic structure can be elongated linearly also in the axial direction L.

Thus, by utilizing the characteristic of an anisotropic elastic material thereby to control the pressures in the three pressure chambers, the tubular elastic structure 18 can be controllably operated to undergo simultaneously the deformations of bending and elongation/contraction.

In the fabrication of the tubular elastic structure 18, the unit elastic tubes 23a, 23b, and 23c, around which the reinforcing fiber 30 has been wound, are bonded together and then covered with silicone rubber film 31. Alternatively, the unit elastic tubes, without the windings of the reinforcing fiber, can be bonded together, then wound as a whole with the reinforcing fiber, and thereafter covered with the silicone rubber film.

Furthermore, the number of the pressure chambers in the tubular elastic structure 18 used in the present invention is not limited to three as in the above described example. This number may be two or four.

The case where the traveling device 1 as illustrated in FIG. 2 is to travel through an elbow in the pipe 7 will be considered. In this case, the device 1 can readily pass through the elbow if the tubular elastic structure 18 is designed to match the curvature of the elbow. The tubular elastic structure 18 itself is capable of bending elastically as the traveling device 1 travels. When it is to pass through an elbow of a gentle curvature, that is, of a radius of curvature of the pipe axis which is three or more times the inner diameter of the pipe, the elastic structure 18 itself readily bends elastically even if pressure is not applied to the pressure chambers to bend the structure.

In the case where the traveling device 1 is to bend and travel through a Tee branch pipe, a miniature TV camera can be mounted on the leading end of the device. Then, by means of a manually operated remote-control device, the traveling device can be steered as the image transmitted from the TV camera is viewed on a monitor screen and verified by the operator. When a turn at a branch pipe is being made, the tubular elastic structure 18 is so operated that its specific curvature is maintained until the outer wheels of the front wheels 6 of the traveling device 1 have passed by the corner of the branch pipe. Thereafter the curvature of the elastic structure 18 is gradually reduced.

Another example of the traveling device according to this invention will now be described with reference to FIGS. 6 and 7.

In this example, assemblies, each comprising a propelling unit 2 and a flexible mechanism 8 joined integrally, are coupled together to face in opposite vertical directions. The traveling device thus assembled is adapted to travel in two directions. Of the components thus assembled, the propelling unit 2 is of the same construction as that in the preceding example. Therefore the flexible mechanism 8 will be described. The two flexible mechanisms 8A and 8B are of the same construction and form and are coupled together in oppositely facing vertical directions as mentioned above. Here the construction of the flexible mechanism 8A will be described.

Figure 6:
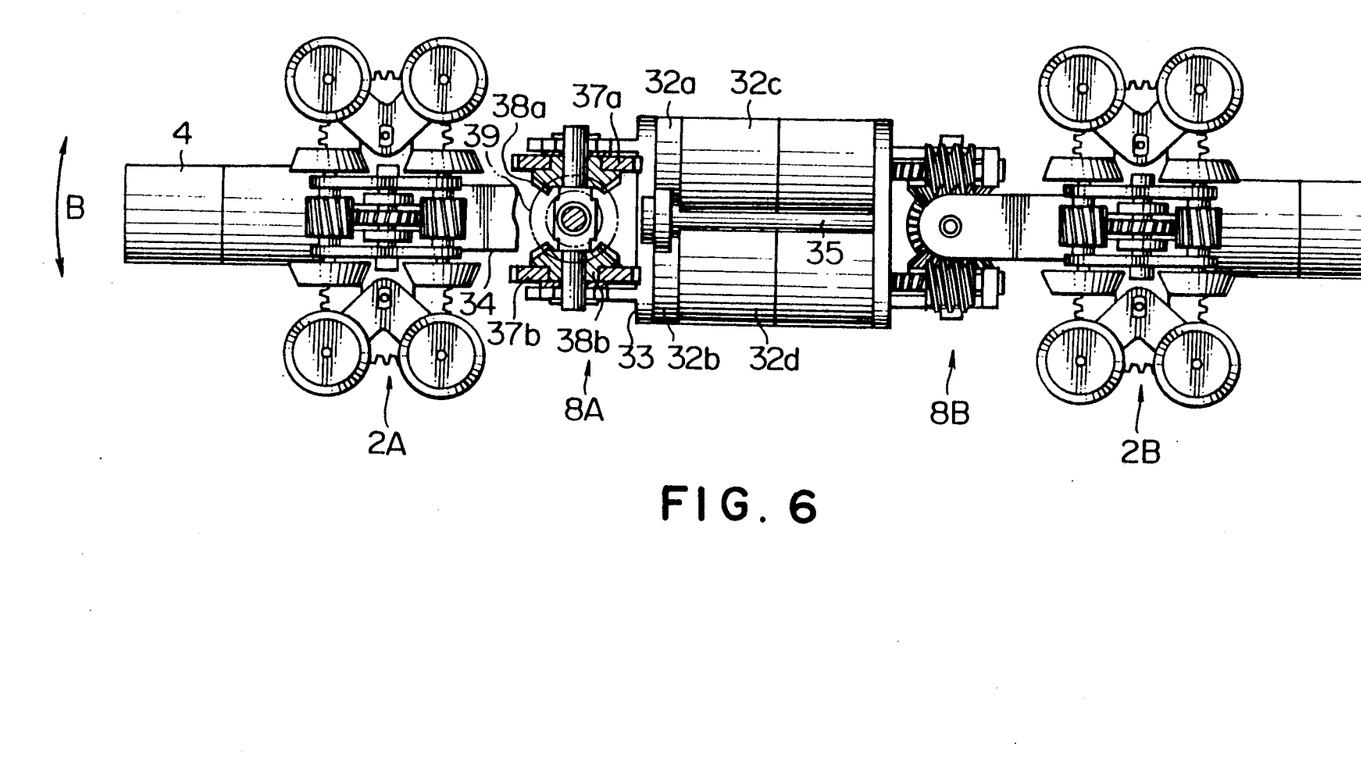
FIGS. 6 and 7 are respectively a plan view and a side view of another example of the traveling device according to the invention.
Figure 7:
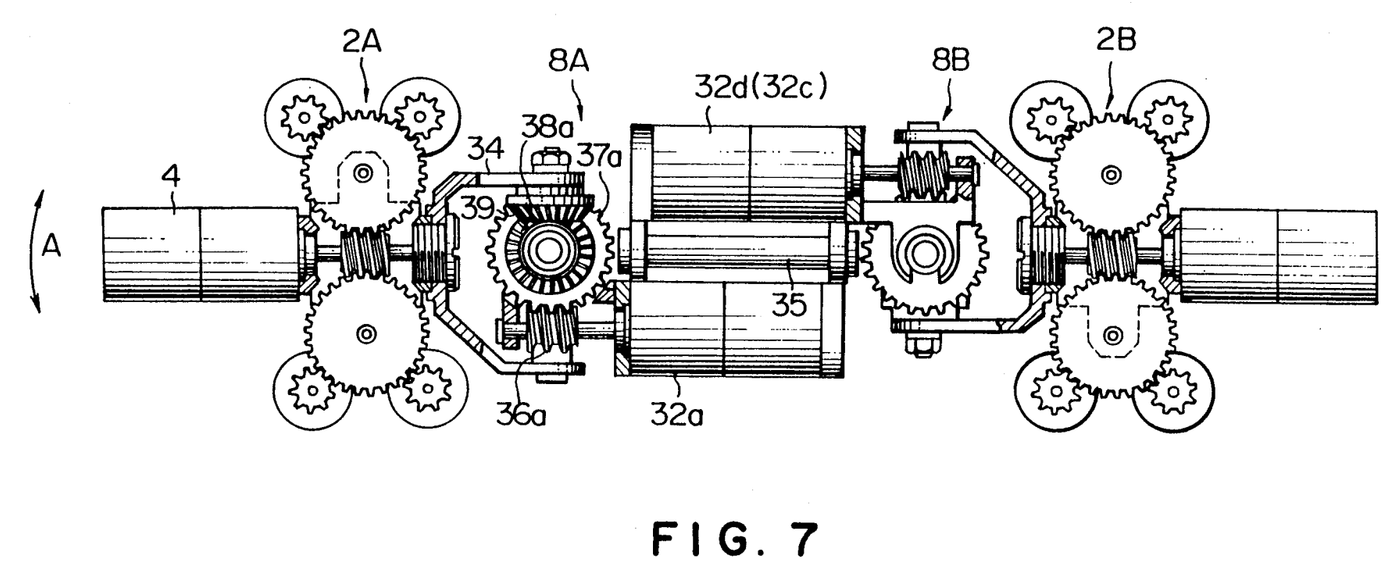

In this mechanism 8A as shown in FIGS. 6 and 7, a bearing bracket 33 having a flat base part and two spaced-apart flanges projecting perpendicularly from the base part is fixed at its base part to the front (left as viewed in FIGS. 6 and 7) end faces of parallelly disposed electric motors 32a and 32b. The two flanges of the bracket 33 support respective bearings which are coaxially disposed. To the rear end of the propelling unit 2A is fixedly secured the root part of a bearing clevis or yoke 34. The two arms of this yoke 34 support at their ends respective bearing which also are coaxially disposed. The axis of the bearings supported by the bearing bracket 33 and the axis of the bearing supported by the bearing yoke 34 intersect perpendicularly. A gimbal mechanism is encompassed by the flanges of the bracket 33 and the arms of the yoke 34 and is supported pivotally to rotate about the above mentioned intersecting axes. This gimbal mechanism contains therewithin a gear train.

The motors 32a and 32b are disposed parallelly and at the same time are coupled by a coupling rod 35 to electric motors 32c and 32d of the flexible mechanism 8B. The four motors 32a, 32b, 32c, and 32d are in a mutually parallel state. Of these motors, the motors 32a and 32b are driving power sources for flexing the flexible mechanism 8A. Worms 36a and 36b are coupled to the ends of the rotor shafts of these motors 32a and 32b. Two worm wheels 37a and 37b are rotatably supported by the bearing parts of the bearing bracket 33 so as to face each other and so as to mesh respectively with the worms 36a and 36b. Furthermore, bevel gears 38a and 38b are fixed coaxially to the inner faces of the worm wheels 37a and 37b. In addition, a bevel gear 39 is fixed to the end of the upper (as viewed in FIG. 7) arm of the yoke 34 so as to mesh simultaneously with both bevel gears 38a and 38b.

In FIG. 7, parts of the flexible mechanism 8A have been cut away to show parts in section thereby to reveal the bevel gears 38 and 29 which would otherwise be hidden.

The flexible mechanism 8 constitutes a differential gear mechanism as described above. Therefore, by switching the rotational directions of the motors 32a and 32b so as to rotate through specific angles, the propelling unit 2 can be swung up-or-down or left-or-right.

The differential gear mechanism is operated in the following manner to cause the swinging motions of the propelling unit 2.

First, the swinging motion in the arrow direction B indicated in FIG. 6 will be considered. In order to produce this motion, the motors 32a and 32b are operated to rotate in opposite directions. Consequently the worm wheels 37a and 37b rotate in opposite directions, and their rotations are transmitted by way of the bevel gears 38a and 38b to rotate the bevel gear 39 through a specific angle. As a result, the propelling unit 2 undergoes a head-swinging movement in a specific direction relative to the motors 32a and 32b. By reversing the above described rotational directions of the motors 32a and 32b, the propelling unit 2 can be swung in the opposite direction.

The propelling unit 2 is swung in the arrow direction A indicated in FIG. 7 by rotating the motors 32a and 32b in the same direction. During this operation, the two bevel gears 38a and 38b in opposed state within the differential mechanism rotate in the same direction, and the bevel gear 39 meshed therewith is restrained from rotating. As a consequence, the rotation transmitted to the differential mechanism is converted into rotation of the worm wheels 37a and 37b. Therefore, the propelling unit 2A undergoes a head swing in the arrow direction A.

Thus, by switching the rotational directions of the motors 32a and 32b, the propelling unit 2 can be operated to swing in any of the up-and-down and left-and-right directions.

Actually, by operating the flexible mechanisms 8A and 8B together in combination, the entire traveling device can be operated to assume a desired flexed state.

Next, an example of a flexible mechanism in which a coupling ring assembly is used instead of a flexible mechanism provided with the above described differential mechanism for imparting flexibility to the traveling device will now be described with reference to FIGS. 8 through 11.

Figure 8:
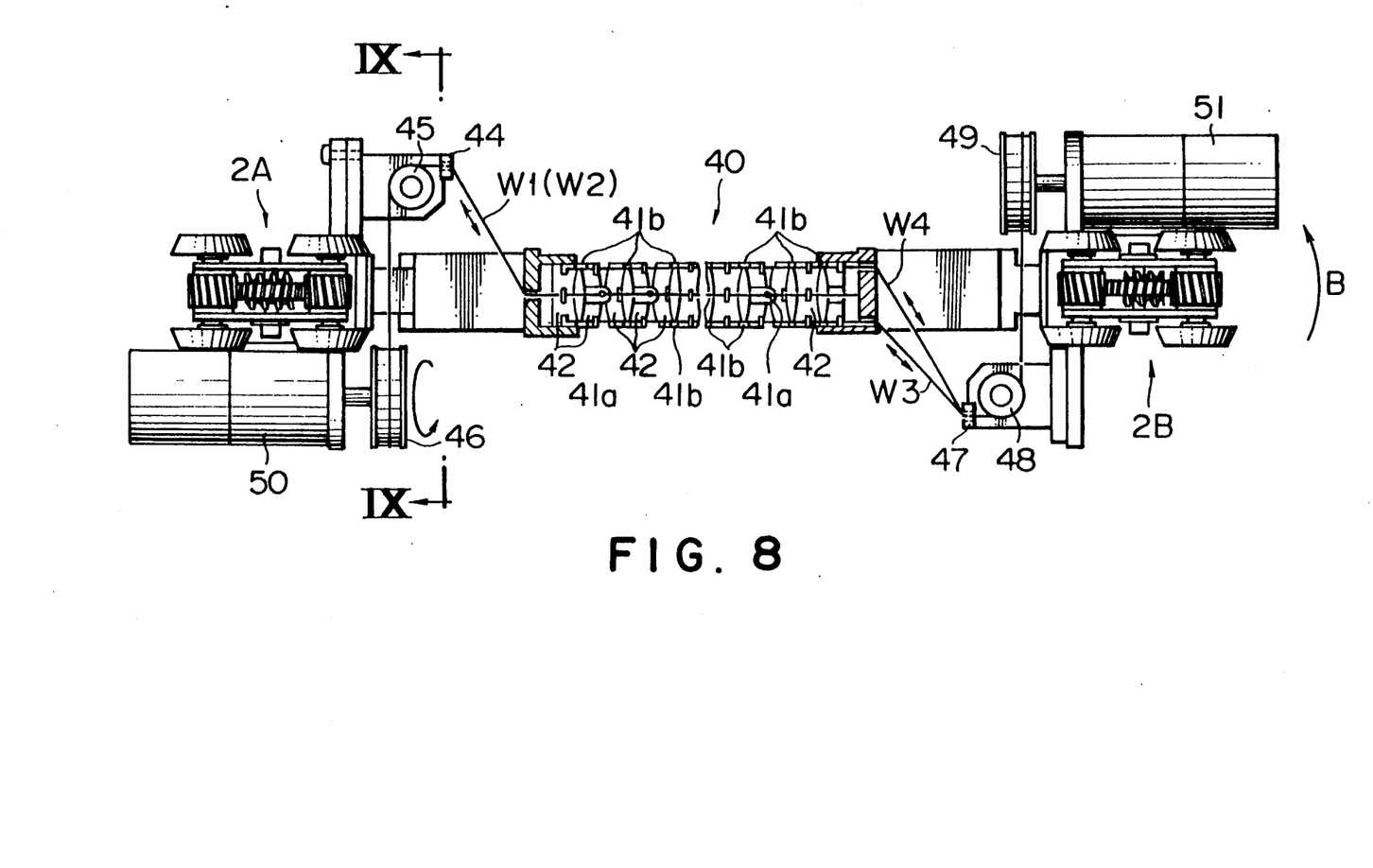
FIGS. 8 through 10 are respectively a plan view, an end view and a side view of still another example of the traveling device of the invention.
Figure 10:
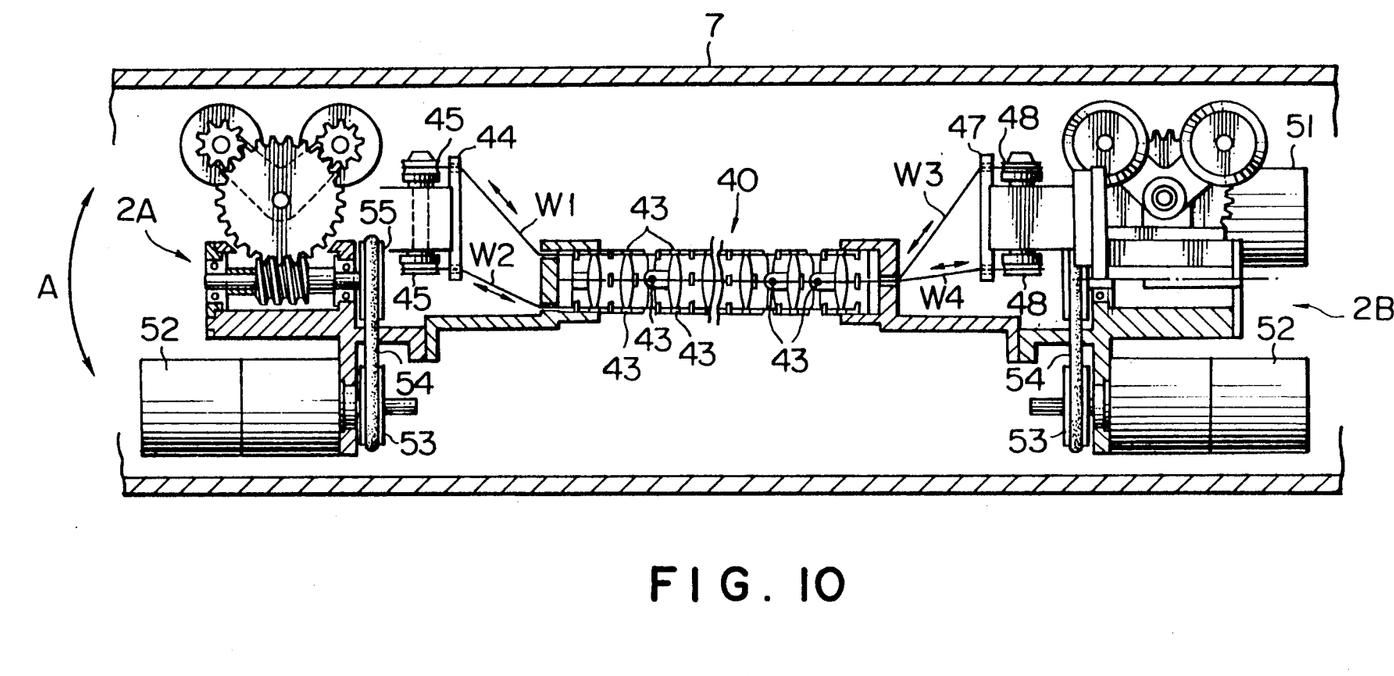

As shown in FIGS. 8 and 10, two propelling units 2A and 2B in this traveling device are joined together by a flexible mechanism having a coupling ring mechanism 40. This coupling ring mechanism 40 comprises a plurality of unit rings 42 having pivot holes 41a and 41b formed alternately therein with axes in perpendicular relation. These unit rings 42 are consecutively joined by coupling pins passed through the pivot holes 41a and 41b to form the coupling ring mechanism 40.

Figure 11:
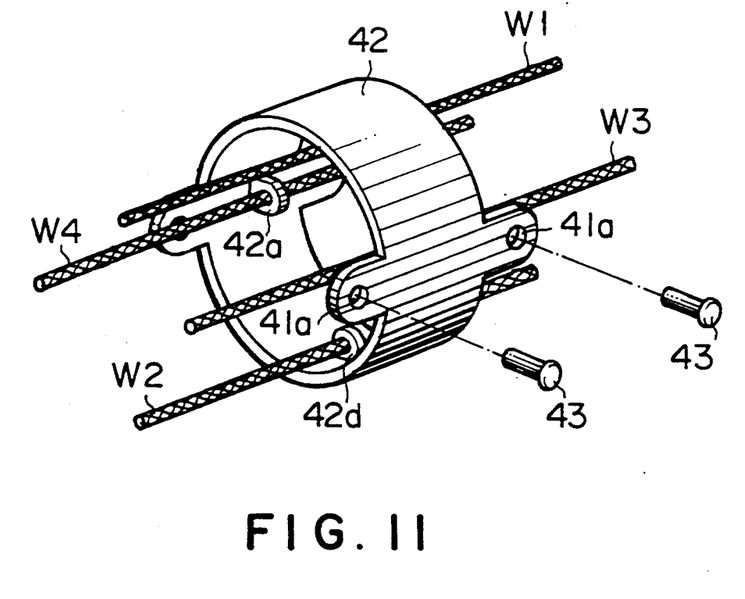
FIG. 11 is a perspective view of one unit ring, a plurality of which when coupled in tandem form a coupling ring assembly in the flexible mechanism of a traveling device of the invention.

Each unit ring 42 is provided on its inner wall surface with four wire cable guides 42a, 42b, 42c, and 42d spaced at equal angular intervals around the ring. Each of these wire cable guides is provided therethrough with a guide hole for guiding a respective one of four actuating cables W1, W2, W3, and W4, which extend in the longitudinal direction through the interior of the coupling ring mechanism 40. By moving these wire cables respectively in the longitudinal direction as described hereinbelow, the flexible coupling ring mechanism 40 can be flexed in any desired direction.

The four wire cables W1 through W4 are wired and operated in the following manner.

As shown in FIGS. 8 and 10, the actuating wire cables W1 and W2 are disposed at upper and lower positions of the coupling ring mechanism 40. At their front (left) parts, these cables W1 and W2 are passed around upper and lower ends of a guide frame 44 fixed to the rear end of the propelling unit 2A and then around upper and lower idler pulleys 45 to be wound around and fixed to a part of a winding pulley 46. The rear ends of the cables W1 and W2 are anchored to the rear end of the coupling ring mechanism 40 at its connection to the front end of the propelling unit 2B.

The actuating cables W3 and W4, on the other hand, are disposed at the opposite lateral sides of the coupling ring mechanism 40. At their rear parts, these cables W3 and W4 are passed around upper and lower ends of a guide frame 47 fixed to the front end of the propelling unit 2B and then around upper and lower idler pulleys 48 to be wound around fixed to a part of a winding pulley 49. The front ends of the cables W3 and W4 are anchored to the front end of the coupling ring mechanism 40 at its connection to the rear end of the propelling unit 2A.

The winding pulleys 46 and 49 can be driven respectively by electric motors 50 and 51 to rotate through specific desired angles.

Figure 9:
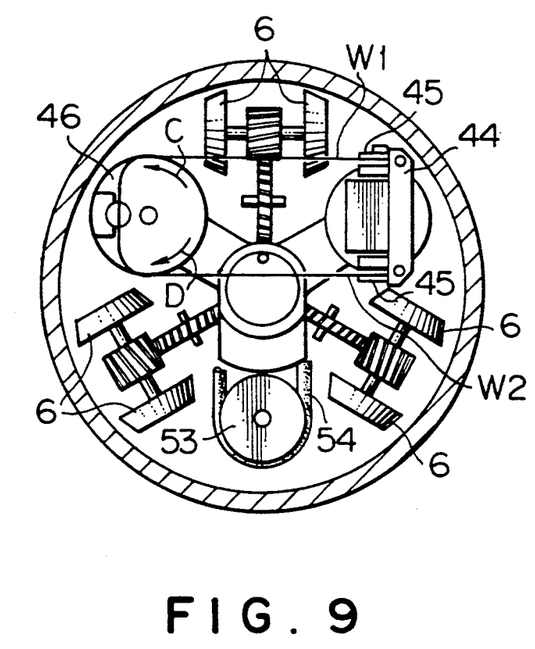

The above described coupling ring mechanism 40 is flexed in the following manner to swing the propelling unit 2A in the arrow direction A. First, the motor 50 is operated to rotate the winding pulley 46 through a specific angle in the arrow direction C as shown in FIG. 9. As a consequence, of the two actuating cables W1 and W2 in opposed positions, the cable W1 is wound, while the cable W2 is unwound and paid out. The unit rings 42 of the coupling ring mechanism 40 thereby pivot slightly at the coupling pins 43. The clearance on the upper side becomes small. At the same time, the clearance on the lower side becomes large. As a total effect, the ring mechanism 40 is flexed to assume a curvature with a convexity on the lower side thereof.

Conversely, when the winding pulley 46 is rotated in the opposite direction D, the cable W2 is wound, while the cable W1 is unwound. Consequently the unit rings 42 and the ring mechanism 40 undergo flexing action which is the reverse of that described above. As a total result, the ring mechanism 40 is flexed to assume a curvature with a convexity on the upper side thereof.

Similarly, the propelling unit 2B can be swung in either of the arrow directions B by controlling the motor 51 to rotate in either of opposite directions. Then, in a manner similar to that described above, the coupling ring mechanism 40 can be flexed to assume a curvature with a convexity on either of the lateral side thereof as a total result.

In the instant example, cable winding motors 50 and 51 are used. In addition electric motors 52 are used for driving the wheels 6. For mounting these motors 52 respectively between adjacent wheels 6, the wheels are disposed at angular spacing intervals of 120 degrees as viewed in the axial direction of the traveling device 1. For this reason, each driving motor 52 is not coupled directly to a worm but transmits its power to the worm by way of a transmitting mechanism comprising a driving pulley 53, an endless belt 54, and a driven pulley 55. The above described arrangement of parts is advantageous in that the overall length of each propelling unit 2 can be shortened, and space for mounting equipment such as a miniature TV camera is afforded.

The foregoing disclosure has been presented with respect to examples of the traveling device of the invention traveling through a horizontal pipe 7, as one example, and the directions up, down, left, and right were arbitrarily set on this basis. However these directions were used merely for convenience in indicating relative positions and configurations of various constituent parts and are not intended to restrict the mechanical organization of the traveling device.

As described above, in the traveling device according to the present invention, a plurality of sun gears, at least two planet gears which revolve around each sun gear as they rotate, and wheels are provided in the propelling mechanisms and are so designed that the pressure with which the wheels press against the inner wall surface of the pipe 7 can be automatically adjusted according to the load. Therefore appropriate wheel pressure can be obtained at all times, and stable traveling is assured.

Furthermore, the traveling device according to this invention is provided with a flexible mechanism enabling the main structure of the device to flex freely. To at least the front and rear ends of this structure are coupled propelling mechanisms as described above. By causing the flexible to flex, the device can be driven as it is steered. Thus a simple and strong driving mechanism is realized, whereby the traveling device can be driven to pass readily through bends and branching parts in the pipe 7.

What is claimed is:

1. A propelling mechanism for traveling through a tubular passageway with an inner wall surface, comprising:
   motive power means;
   a plurality of sun gears driven in rotation by said motive power means;
   at least two planet gears meshed with each one of said sun gears and rotatably supported at specifically spaced-apart positions to undergo axial rotation about their own axes and simultaneously to undergo orbital revolution around the periphery of said sun gear; and
   a plurality of traction wheels with treads rotating together with respective said planet gears, said treads being pressed into contact with said inner wall surface by said orbital revolution of the planet gears, driving power due to said axial rotation of the planet gears being transmitted by way of said treads of the wheels as traction to said inner wall surface.

2. A propelling mechanism as claimed in claim 1, in which said planet gears meshed with each one of said sun gears are fixed to respective shafts rotatably supported by respective outer ends of arms of L shaped levers pivotally supported at their middle bend parts to pivot about an axis coincident with the rotational axis of said sun gear, and a plurality of said traction wheels are also fixed to each of said shafts, whereby some of said wheels are pressed into tractive contact with said inner wall surface by a force arising from said orbital revolution, which is thereby arrested, substantially all of the power exerted by the sun gear thereupon being transmitted by way of said axial rotation of the planet gears to the wheels thus pressed.

3. A traveling device comprising:
a steerable connecting means constituting a main body thereof and having front and rear ends, a plurality of propelling mechanisms coupled to at least said front and rear ends,
means for controllably deflecting said steerable connecting means in steering operation in any directions each of said propelling mechanisms comprising:
motive power means, a plurality of sun gears driven in rotation by said motive power means, at least two planet gears meshed with each one of said sun gears and rotatably supported at specifically spaced-apart positions to undergo axial rotation about their own axes and simultaneously to undergo orbital revolution around the periphery of said sun gear; and a plurality of traction wheels with treads rotating together with respective said planet gears, said treads being pressed into contact with said inner wall surface by said orbital revolution of the planet gears, driving power due to said axial rotation of the planet gears being transmitted by way of said treads of the wheels as traction to said inner wall surface.

4. A traveling device as claimed in claim 3, in which said steerable connecting means comprises a flexible structure which can be deflected by said control means.

5. A traveling device as claimed in claim 4, in which said flexible structure is a tubular elastic structure the interior of which is separated into a plurality of axially extending pressure chambers by at least one axially extending partition.

6. A traveling device as claimed in claim 3, in which two of said propelling mechanisms are provided to travel respectively in two directions and are coupled together, via differential gear mechanisms, by a plurality of motors for steering connected to and disposed between said differential gear mechanisms, said differential gear mechanisms and said plurality of motors for steering constituting said steerable connecting means.

* * * * *